(12) United States Patent
Li et al.

(10) Patent No.: US 11,044,102 B1
(45) Date of Patent: Jun. 22, 2021

(54) SYSTEMS AND METHODS FOR DETECTING CERTIFICATE PINNING

(71) Applicant: NortonLifeLock Inc., Tempe, AZ (US)

(72) Inventors: Qing Li, Cupertino, CA (US); Stanley Stanton Kiefer, Navarre, FL (US); Brian Varner, Polk City, FL (US); Jacques Fourie, Acton, MA (US); Samir Kapuria, Bedford, MA (US); Scott Wilde, Malden, MA (US)

(73) Assignee: NortonLifeLock Inc., Tempe, AZ (US)

( * ) Notice: Subject to any disclaimer, the term of this patent is extended or adjusted under 35 U.S.C. 154(b) by 0 days.

(21) Appl. No.: 17/006,581

(22) Filed: Aug. 28, 2020

(51) Int. Cl.
  *H04L 29/06* (2006.01)
  *H04L 9/32* (2006.01)
  *H04L 29/12* (2006.01)

(52) U.S. Cl.
  CPC .......... *H04L 9/3263* (2013.01); *H04L 9/3247* (2013.01); *H04L 61/15* (2013.01); *H04L 63/0281* (2013.01); *H04L 63/166* (2013.01)

(58) Field of Classification Search
  CPC ..... H04L 9/3263; H04L 61/15; H04L 9/3247; H04L 63/166; H04L 63/0281
  See application file for complete search history.

(56) References Cited

U.S. PATENT DOCUMENTS

2018/0288062 A1* 10/2018 Goyal ................. H04L 63/1408
2020/0092264 A1* 3/2020 Rahkonen ............. H04L 63/166

OTHER PUBLICATIONS

Stone, Chris McMahon, Tom Chothia, and Flavio D. Garcia. "Spinner: Semi-automatic detection of pinning without hostname verification." Proceedings of the 33rd Annual Computer Security Applications Conference. 2017. (Year: 2017).*

* cited by examiner

*Primary Examiner* — Joseph P Hirl
*Assistant Examiner* — Ka Shan Choy
(74) *Attorney, Agent, or Firm* — FisherBroyles, LLP

(57) ABSTRACT

The disclosed computer-implemented method for detecting certificate pinning may include (i) attempting, by a security network proxy, to break a network connection between a client device and a server device, (ii) detecting, by the security network proxy, whether the network connection between the client device and the server device is certificate pinned based on a result of attempting to break the network connection, and (iii) performing a security action by the security network proxy to protect the client device at least in part based on detecting whether the network connection between the client device and the server device is certificate pinned. Various other methods, systems, and computer-readable media are also disclosed.

20 Claims, 8 Drawing Sheets

SYSTEMS AND METHODS FOR DETECTING CERTIFICATE PINNING

BACKGROUND

As network transport security grows, it becomes more important that network providers have a mechanism to detect security changes and adapt quickly. One of the more recent transport security mechanisms is Transport Layer Security ("TLS") certificate pinning. In this mechanism, network clients (primarily mobile devices) are provided with certificates during application development that are expected from a specific network domain the client communicates with. If the client receives a certificate that can only be generated from the server itself, it knows with more certainty that it is communicating with the intended server and not another server impersonating the intended server. This mechanism also protects against network snooping and interception.

For example, if a malicious user is attempting to exfiltrate data from a corporate network, this can be detected based on any discrepancy observed when examining the offered certificate against the one that is known by the client beforehand, to ensure corporate secrets are not traversing to unauthorized locations or networks. When clients and servers use certificate pinning, it prevents this interception from occurring and breaking the encryption will break a corresponding application. For example, most mobile device application stores use certificate pinning to ensure users are connecting to an authentic location for mobile applications. If certificate interception is used on those pinned connections, the application stores fail to function. The unintended consequence of deploying security appliances that intercept and decrypt TLS network traffic for legitimate reasons is that the application will fail to work properly if it is utilizing certificate pinning. The present disclosure, therefore, identifies and addresses a need for systems and methods for detecting certificate pinning.

SUMMARY

As will be described in greater detail below, the present disclosure describes various systems and methods for detecting certificate pinning. In one example, a computer-implemented method for detecting certificate pinning may include (i) attempting, by a security network proxy, to break a network connection between a client device and a server device, (ii) detecting, by the security network proxy, whether the network connection between the client device and the server device is certificate pinned based on a result of attempting to break the network connection, and (iii) performing a security action by the security network proxy to protect the client device at least in part based on detecting whether the network connection between the client device and the server device is certificate pinned.

In some examples, attempting to break the network connection between the client device and the server device may include intercepting a digital certificate that the server device directed to the client device to establish encrypted communications. In some examples, attempting to break the network connection between the client device and the server device may include the security network proxy forwarding a different digital certificate to the client device as a substitute rather than forwarding the digital certificate that the server device directed to the client device. In one embodiment, the attempt to break the network connection between the client device and the server device succeeds in response to an application at the client device verifying that the different digital certificate does not match an identifier for a digital certificate expected by the application according to certificate pinning.

In one embodiment, the digital certificate that the server device directed to the client device to establish encrypted communications is provided by the server device according to the Transport Layer Security protocol. In one embodiment, the Transport Layer Security protocol may include either Transport Layer Security protocol version sub-1.3 and Transport Layer Security protocol version 1.3 or greater.

In one embodiment, the security action performed by the security network proxy may include whitelisting a domain corresponding to the server device based on detecting that the network connection between the client device and the server device is certificate pinned. In one embodiment, the security network proxy maintains a cache that maps domains to Internet Protocol addresses.

In some examples, detecting whether the network connection between the client device and the server device is certificate pinned is based on an analysis of (i) the Transport Layer Security protocol handshake message, (ii) a transmission control protocol FIN packet, and/or (iii) a transmission control protocol RST packet. In some examples, performing the security action by the security network proxy includes decrypting network traffic, extracting at least one attribute of the decrypted network traffic, and applying a security policy to subsequent encrypted network traffic based on the extracted attribute.

In one embodiment, a system for implementing the above-described method may include (i) an attempting module, stored in memory, that attempts, as a part of a security network proxy, to break a network connection between a client device and a server device, (ii) a detection module, stored in memory, that detects, as a part of the security network proxy, whether the network connection between the client device and the server device is certificate pinned based on a result of attempting to break the network connection, (iii) a performance module, stored in memory, that performs a security action as a part of the security network proxy to protect the client device at least in part based on detecting whether the network connection between the client device and the server device is certificate pinned, and (iv) at least one physical processor configured to execute the attempting module, the detection module, and the performance module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) attempt, by a security network proxy, to break a network connection between a client device and a server device, (ii) detect, by the security network proxy, whether the network connection between the client device and the server device is certificate pinned based on a result of attempting to break the network connection, and (iii) perform a security action by the security network proxy to protect the client device at least in part based on detecting whether the network connection between the client device and the server device is certificate pinned. In these examples, the computing device may include the security network proxy.

Features from any of the embodiments described herein may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the present disclosure.

Figure 1:
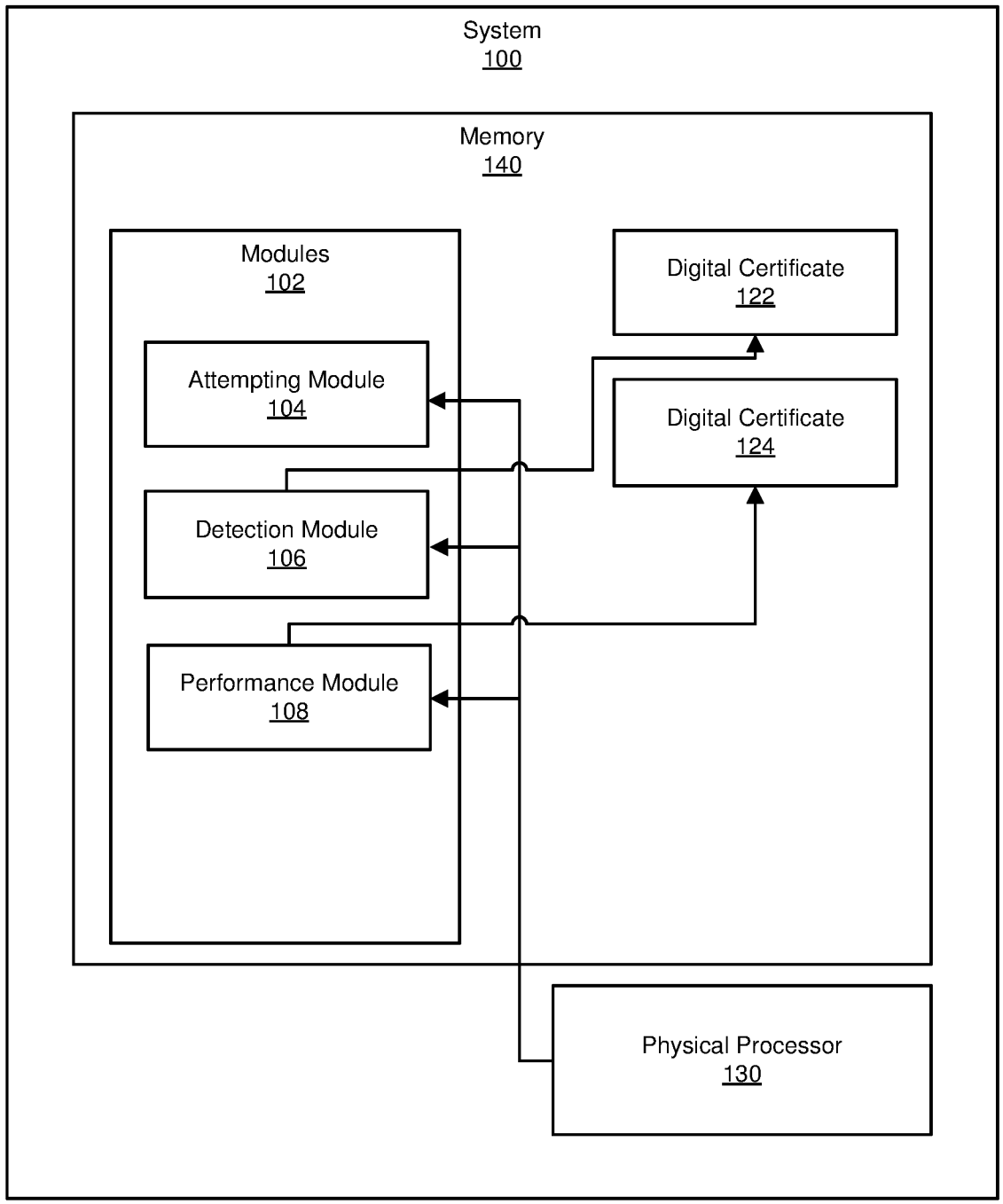
FIG. 1 is a block diagram of an example system for detecting certificate pinning.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the present disclosure covers all modifications, equivalents, and alternatives falling within the scope of the appended claims.

DETAILED DESCRIPTION OF EXAMPLE EMBODIMENTS

The present disclosure is generally directed to systems and methods for detecting certificate pinning. The disclosed subject matter here may address a problem whereby related proxy servers intentionally intercept and spoof or substitute encryption protocol handshake negotiation messages to allow the proxy servers to decrypt network traffic and apply any number of security policies (e.g., blocking the transmission of corporate secrets) to the decrypted network traffic, which would otherwise be impossible through conventional use of the corresponding encryption protocol. Although these related proxy servers may have had some success, the related proxy servers may break the functionality of corresponding applications when certificate pinning is performed.

Figure 6:
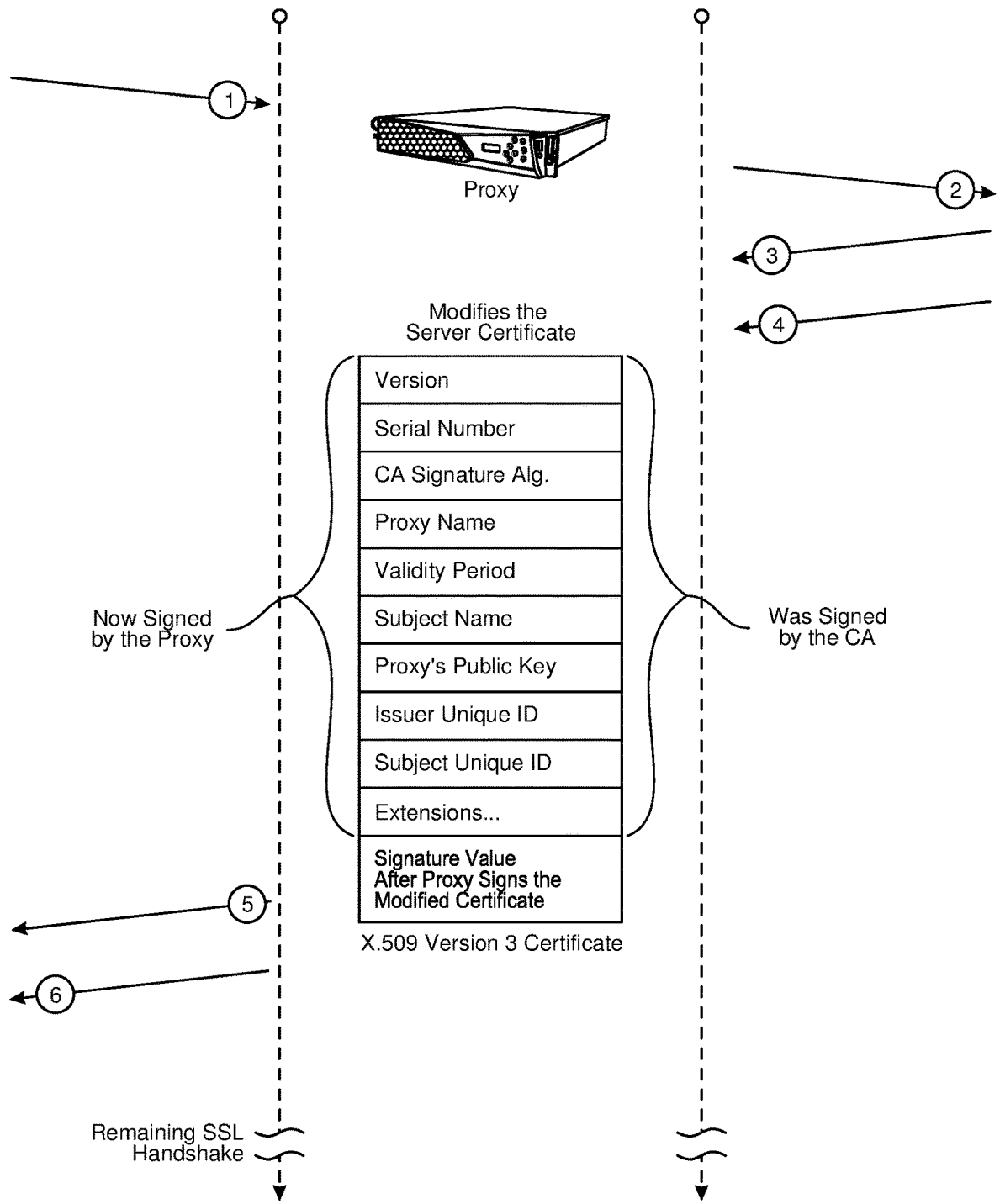
FIG. 6 is a timing diagram of a workflow for digital certificate interception.

FIG. 6 shows a timing diagram corresponding to the related proxy servers discussed above. As shown in this figure, at step one, a proxy may intercept a client hello (e.g., "ClientHello") message from a computing device such as computing device 202 shown in FIGS. 1-2. At step two, the proxy may forward the client hello message to a server destination to which the client had directed this message. At step three, the server destination may provide an expected digital certificate in response to the request transmitted at step two. At step four, the proxy may modify the expected digital certificate and generate a substitute digital certificate. As further shown in this figure, the expected digital certificate may have been signed by a certificate authority, but the substitute digital certificate, after modification, may be signed by the proxy itself. For example, the field of the "issuer name" may have been changed to specify a name of the proxy. Similarly, a field of the "subject public key" may have been modified to specify a public key of the proxy. Moreover, a field fora signature value may have been modified from a previous signature value to a new signature value after the proxy signs the modified digital certificate. At step five, the proxy can transmit to the client device a server hello (e.g., "ServerHello") message. Subsequently, at step six, the proxy may follow-up by transmitting the modified digital certificate that was optionally generated at step four, as discussed above. After this interception procedure is successfully performed, the application at the computing device may understand that it is executing encrypted communication between itself and the server destination, but in reality the proxy is performing a beneficial illusion for security purposes to decrypt the network traffic, as an intermediary, and thereby apply one or more security policies to the decrypted network traffic.

One challenge with using the beneficial security proxy system outlined above is the configuration of some applications to perform certificate pinning. As used herein, the term "certificate pinning" refers to an application being programmed to check whether an identifier for an expected digital certificate (e.g., an identifier or hash of a digital certificate or the digital certificate itself) matches a digital certificate that was actually received. In these scenarios, if an application attempts to establish a network connection with the network destination and receives a digital certificate in response that does not match the expected digital certificate, then the application may terminate or otherwise break in terms of functionality. Accordingly, certificate pinning effectively prevents security proxy servers, with good intentions, from performing beneficial interception procedures, as outlined above, because these interception procedures rely upon switching the digital certificate used for encrypted communication (i.e., to enable the security proxy servers to decrypt and apply security policies to network traffic), and the switching procedure causes applications that perform certificate pinning to effectively break.

In view of the above, without a better solution, the use of certificate pinning will result in either a proxy security server (i) intentionally failing to perform a beneficial interception procedure in order to avoid the breaking of application functionality or (ii) breaking and preventing the application from functioning. Moreover, the related proxy servers currently have no effective mechanism for detecting whether a monitored network connection is conducted according to certificate pinning or not. The inventive subject matter of this application may optionally improve upon these related proxy servers by using novel and inventive procedures for detecting, at a proxy server, whether a network connection is certificate pinned. In response to detecting that the network connection is certificate pinned, the proxy server may whitelist a network destination or domain to which the corresponding application is attempting to connect, such that automatic retry attempts to establish the network connection will succeed. The fact that certificate pinning provides a heightened level of security in comparison to conventional encryption protocol procedures that are not pinned may justify the use of the whitelist. Moreover, the original attempt to break the network connection may result in the first attempt at the network connection failing, which may indicate that the network traffic is certificate pinned, as further discussed in detail below, thereby providing a novel and inventive procedure for enabling security proxy servers to detect whether network connections are pinned in this manner.

Figure 2:
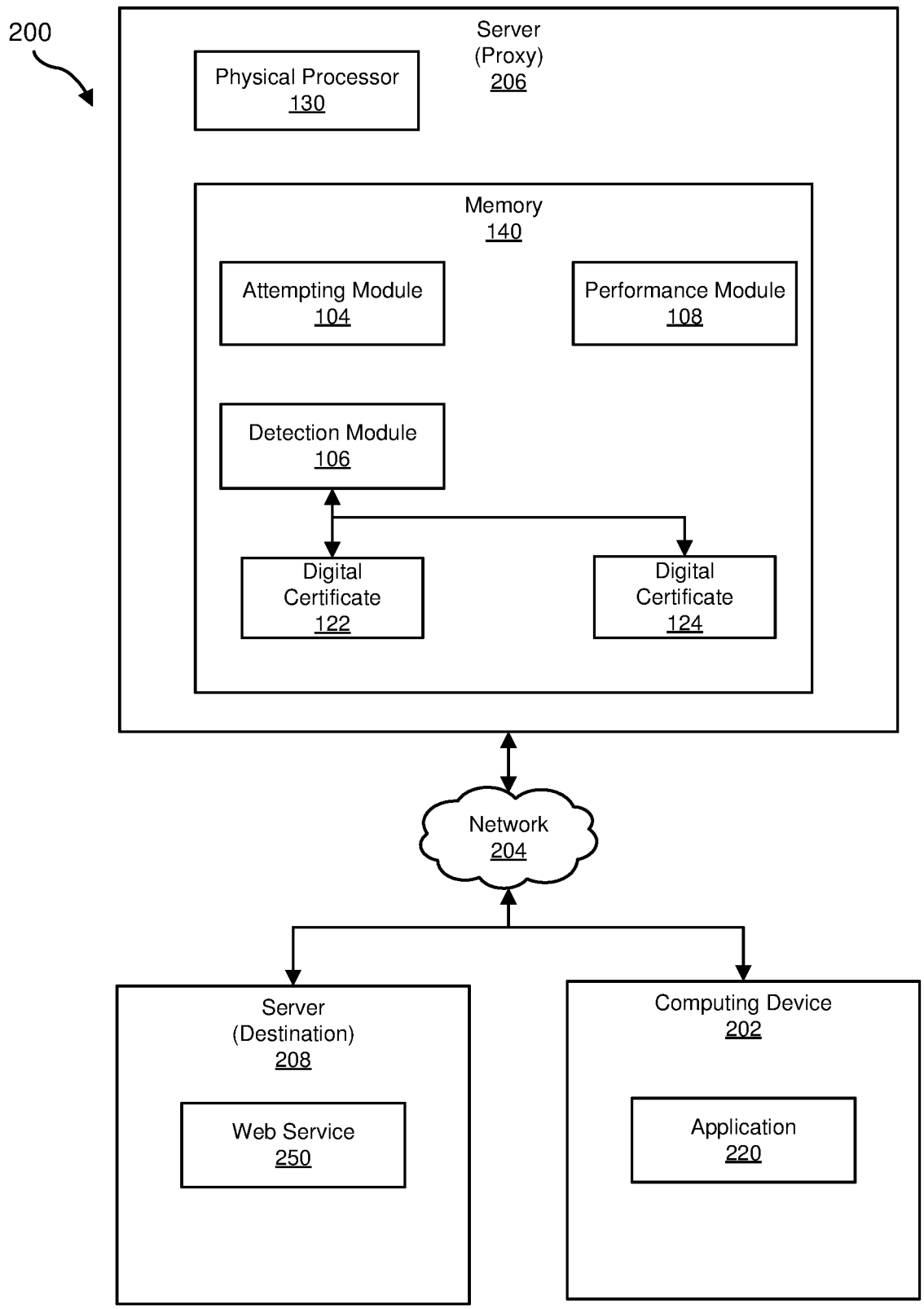
FIG. 2 is a block diagram of an additional example system for detecting certificate pinning.

The following will provide, with reference to FIGS. 1-2, detailed descriptions of example systems for detecting certificate pinning. Detailed descriptions of corresponding computer-implemented methods will also be provided in connection with FIGS. 3-6. In addition, detailed descriptions of an example computing system and network architecture capable of implementing one or more of the embodiments described herein will be provided in connection with FIGS. 7 and 8, respectively.

FIG. 1 is a block diagram of example system 100 for detecting certificate pinning. As illustrated in this figure, example system 100 may include one or more modules 102 for performing one or more tasks. For example, and as will be explained in greater detail below, example system 100 may include an attempting module 104 that attempts, as a part of a security network proxy, to break a network connection between a client device and a server device. Example system 100 may additionally include a detection module 106 that detects, as a part of the security network proxy, whether the network connection between the client device and the server device is certificate pinned based on a result of attempting to break the network connection. For example, detection module 106 may detect whether a procedure of intercepting an original and authentic digital certificate (e.g., one that is genuinely provided by a network destination to which a corresponding application has attempted to connect), such as a digital certificate 122, with another different digital certificate (i.e., one that is provided and maintained by a security network proxy), such as a digital certificate 124, breaks the attempt to establish the network connection. Example system 100 may also include a performance module 108 that performs a security action as part of the security network proxy to protect the client device at least in part based on detecting whether the network connection between the client device and the server device is certificate pinned. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., computing device 202 and/or server 206). One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate detecting certificate pinning. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

Example system 100 in FIG. 1 may be implemented in a variety of ways. For example, all or a portion of example system 100 may represent portions of example system 200 in FIG. 2. As shown in FIG. 2, system 200 may include a computing device 202 in communication with a server 206 via a network 204. In one example, all or a portion of the functionality of modules 102 may be performed by computing device 202, server 206, and/or any other suitable computing system. As will be described in greater detail below, one or more of modules 102 from FIG. 1 may, when executed by at least one processor of computing device 202 and/or server 206, enable computing device 202 and/or server 206 to detect certificate pinning.

Attempting module 104 may attempt, as a part of a security network proxy, which may correspond to a server 206, to break a network connection between a client device (which may correspond to a computing device 202) and a server device (which may correspond to a server 208). The network connection may have been initiated by an application 220 executing on computing device 202 while trying to reach a web service 250 located at server 208. Detection module 106 may detect, as part of server 206, whether a network connection between computing device 202 and server 208 is certificate pinned based on a result of attempting to break the corresponding network connection. Performance module 108 may perform a security action as part of server 206 to protect computing device 202 at least in part based on detecting whether the corresponding network connection between computing device 202 and server 208 is certificate pinned.

Computing device 202 generally represents any type or form of computing device capable of reading computer-executable instructions. One illustrative example of computing device 202 may include a smartphone. Additional examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), smart vehicles, smart packaging (e.g., active or intelligent packaging), gaming consoles, so-called Internet-of-Things devices (e.g., smart appliances, etc.), variations or combinations of one or more of the same, and/or any other suitable computing device.

Server 206 generally represents any type or form of computing device that is capable of performing method 300 and/or one or more variants of method 300, as further discussed and disclosed below. Additional examples of server 206 include, without limitation, security servers, application servers, web servers, storage servers, and/or database servers configured to run certain software applications and/or provide various security, web, storage, and/or database services. Although illustrated as a single entity in FIG. 2, server 206 may include and/or represent a plurality of servers that work and/or operate in conjunction with one another. The hardware and/or software configuration of server 208 may optionally parallel the configuration of server 206 in whole or in part.

Network 204 generally represents any medium or architecture capable of facilitating communication or data transfer. In one example, network 204 may facilitate communication between computing device 202 and server 206. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

Figure 3:
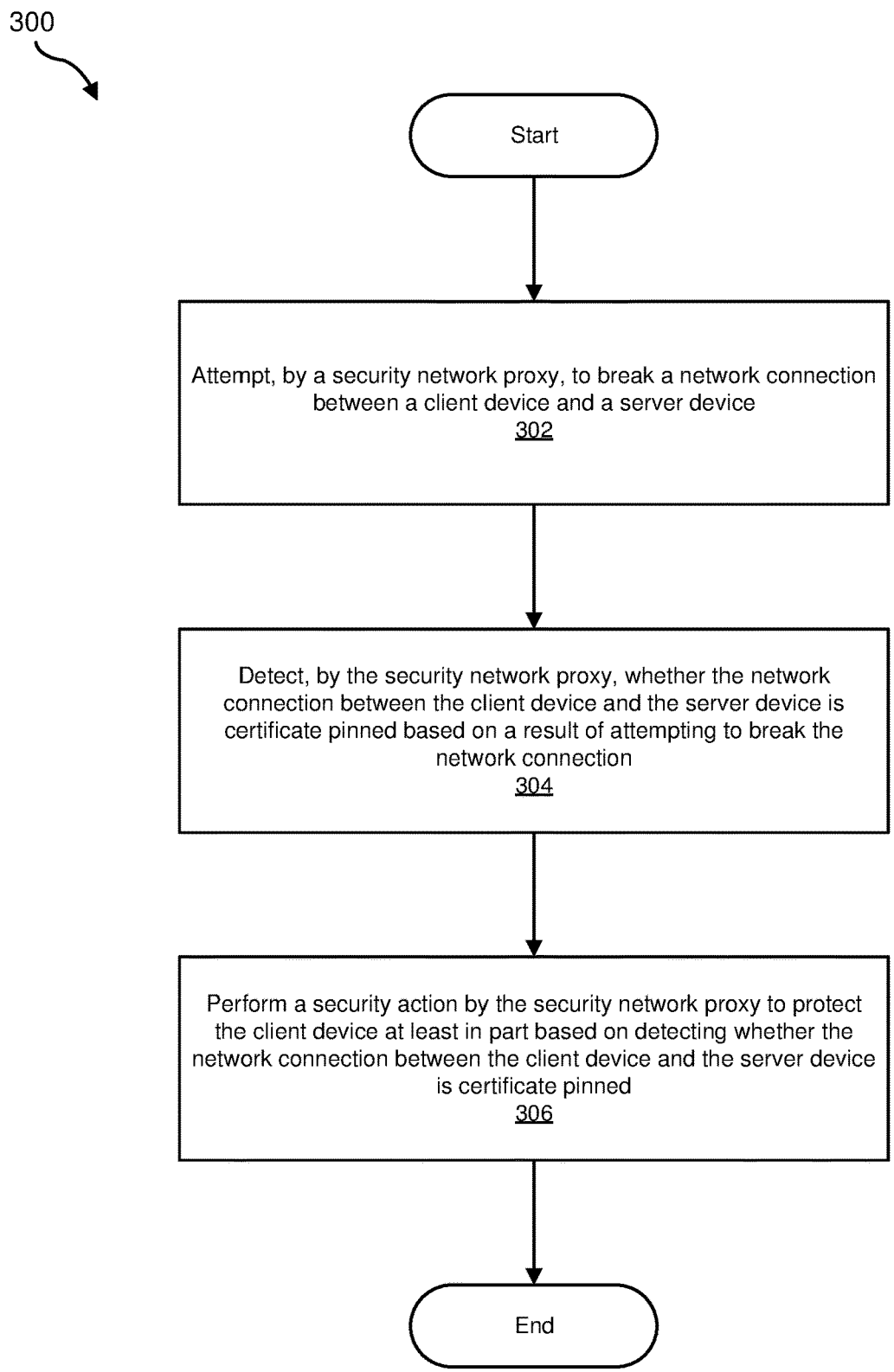
FIG. 3 is a flow diagram of an example method for detecting certificate pinning.

FIG. 3 is a flow diagram of an example computer-implemented method 300 for detecting certificate pinning. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302, one or more of the systems described herein may attempt, as a part of a security network proxy, to break a network connection between a client device and a server device. For example, attempting module 104 may attempt, as part of server 206, to break a network connection between computing device 202 and server 208.

Attempting module 104 may attempt to break the network connection in a variety of ways. In some examples, attempting module 104 may attempt to break the network connection at least in part by attempting to break a negotiation procedure that initiates and establishes the network connection. In the example of certificate pinning, attempting module 104 may attempt to break the network connection by providing computing device 202 with a digital certificate, such as digital certificate 124, that is different from a digital certificate, such as digital certificate 122, that an application executing on computing device 202 is expecting (e.g., because an identifier of digital certificate 122 has been encoded within the application). In other words, in these examples, the attempt to break the network connection between the client device and the server device may succeed in response to an application at the client device verifying that the different digital certificate does not match an identifier for a digital certificate expected by the application according to certificate pinning.

In some examples, attempting module 104 may attempt to break the network connection between the client device and the server device by intercepting a digital certificate that the server device directed to the client device to establish encrypted communications. In these examples, attempting module 104 may further attempt to break the network connection by forwarding a different digital certificate, such as digital certificate 124, to computing device 202 as a substitute rather than forwarding digital certificate 122 that server 208 directed to the computing device 202.

Figure 4:
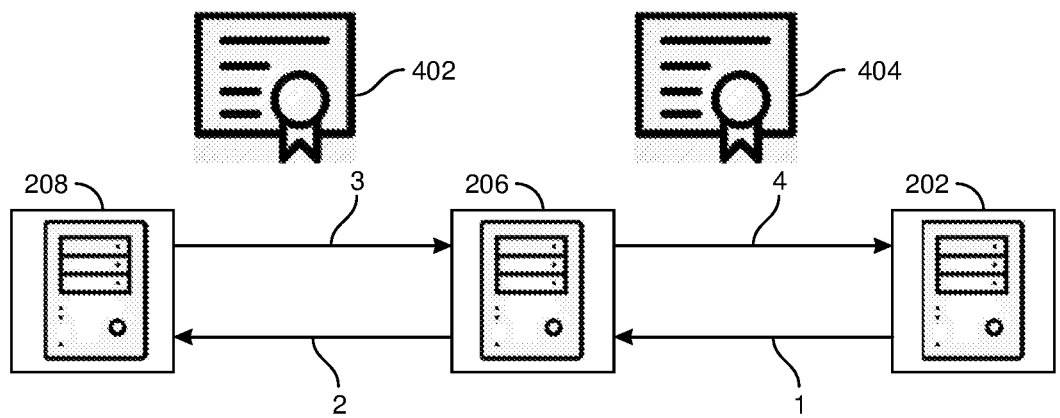
FIG. 4 is a timing diagram of an example workflow for detecting certificate pinning.

FIG. 4 provides a helpful illustration of how a proxy server corresponding to server 206 may substitute an unexpected digital certificate for another digital certificate that is expected according to certificate pinning. FIG. 4 may correspond to a simplified version of the timing diagram shown in FIG. 6. As further shown in this figure, at step one, computing device 202 may transmit a request for a digital certificate and direct the request to server 208, as further discussed above. Prior to reaching the intended destination at server 208, server 206, acting as a security proxy, may intercept the request issued at step one. Accordingly, server 206 may be performing a kind of "man-in-the-middle" compromise procedure, except that this procedure is being performed for beneficial security purposes rather than malicious purposes. After receiving the intercepted request that was transmitted at step one, server 206 may recognize that computing device 202 is requesting a digital certificate from server 208. Subsequently, at step two, server 206 may thereby forward the request to server 208. At step three, server 208 may respond to the request for the digital certificate by providing an expected digital certificate 402, which may correspond to digital certificate 122 discussed above.

Again, server 206 may intercept the transmission of digital certificate 402 at step three. Rather than forwarding the digital certificate 402 to computing device 202, server 206 may substitute an unexpected digital certificate 404 rather than the digital certificate 402 that was expected by computing device 202. At step four, server 206 may provide the substituted digital certificate 404 to computing device 202 rather than the expected digital certificate 402. Accordingly, in these examples, if the application requesting the digital certificate at computing device 202 is configured according to certificate pinning, then it will check whether the received digital certificate matches an identifier for a digital certificate that the computing device 202 is expecting (i.e., an identifier for digital certificate 402).

At step 304, one or more of the systems described herein may detect, as a part of the security network proxy, whether the network connection between the client device and the server device is certificate pinned based on a result of attempting to break the network connection. For example, detection module 106 may detect as part of server 206 whether the network connection between computing device 202 and server 208 is certificate pinned based on a result of attempting to break the network connection.

Figure 5:
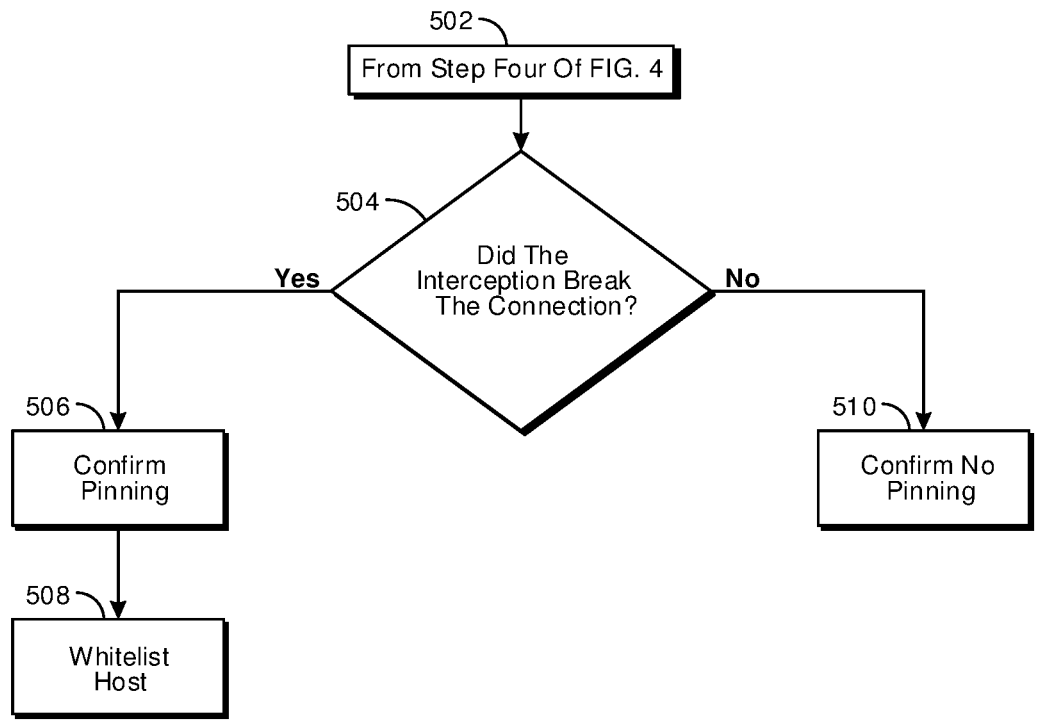
FIG. 5 is a flow diagram of an example method for detecting certificate pinning.

Detection module 106 may detect whether the network connection between the client device and the server device is certificate pinned in a variety of ways. Generally speaking, detection module 106 may conclude that the network connection is certificate pinned, or is more likely to be certificate pinned, if the attempt to break the network connection at step 302 succeeds. FIG. 5 shows an illustrative flow diagram of how detection module 106 may detect whether the network connection is certificate pinned. In particular, the flow diagram of this figure may start at step 502, which may continue from step four of FIG. 4, as further discussed above.

As further shown in FIG. 5, from step 502 the flow diagram may proceed to a step 504. At step 504, detection module 106 may determine whether the attempt succeeded to break the network connection performed at step 302, as discussed above. If the decision at step 504 is "yes," then the flow diagram may proceed to step 506, at which point detection module 106 may confirm that the application attempting to establish the network connection at step 302 is configured according to certificate pinning (i.e., that the corresponding application is checking whether a received digital certificate matches an identifier for an unexpected digital certificate). Alternatively, if the decision at step 504 is "no," then the flow diagram may proceed to step 510, at which point detection module 106 may confirm that the application is not configured according to certificate pinning and, therefore, does not verify whether a received digital certificate matches an expected digital certificate, as discussed above.

In the example of FIG. 5, detection module 106 may make a conclusion regarding certificate pinning based entirely upon the decision performed at step 504. In other words, the decision at step 504 may translate into a binary conclusion regarding whether the application is configured according to certificate pinning. Alternatively, in other examples, detection module 106 may simply use the decision at step 504 as one factor or basis that increases the likelihood of the application being configured according to certificate pinning. In these examples, detection module 106 may also base a final conclusion of whether the application is configured according to certificate pinning on one or more additional factors. For example, detection module 106 may detect whether the network connection between the client device and the server device is certificate pinned based on an analysis of at least one of (i) the Transport Layer Security protocol handshake message, (ii) a transmission control protocol FIN packet and/or (iii) a transmission control protocol RST packet, as further discussed below.

In one embodiment, the security network proxy maintains a cache that maps domains to Internet Protocol addresses. Maintaining the cache may be beneficial, because it allows server 206 to whitelist domains instead of IP addresses. In this context, the domains themselves are the more helpful targets for applying security policies, because identical host names can result in different Internet Protocol addresses. In other words, the transmission control protocol uses numerical Internet Protocol addresses to identify hosts on the Internet, and the DNS protocol allows the use of host names composed of character strings, thereby providing a means to translate those names to corresponding numerical addresses. Accordingly, by tracking a client device's DNS requests, detection module 106 can obtain information that allows itself to more accurately decide how to handle future network communications than when only the Internet protocol address information is available.

In some examples, the digital certificate that the server device directed to the client device to establish encrypted communications is provided by the server device according to the Transport Layer Security protocol. Particularly, the Transport Layer Security protocol may include Transport Layer Security protocol version sub-1.3 (i.e., version 1.3 or a lower numbered version). Alternatively, the Transport Layer Security protocol may include version 1.3 or greater. In other examples, the digital certificate may be provided according to another encryption protocol such as Secure Sockets Layer ("SSL") encryption or any other suitable form of encryption including asymmetric or public-key infrastructure cryptography.

In the example of Transport Layer Security protocol version sub-1.3, as soon as a TLS ServerCertificate record is seen within the intercepted network traffic, then detection module 106 may set a flag on the corresponding network connection where the flag indicates that the network connection is certificate pinned. Detection module 106 may optionally clear this flag when a TLS encrypted payload is sent from the client device to the server device. If detection module 106 detects that the network connection is terminated at the level of the transmission control protocol (e.g., based on analyzing the Transport Layer Security protocol handshake message), before the flag has been cleared, as discussed above, then detection module 106 may determine that the network connection is certificate pinned.

In contrast, in the example of Transport Layer Security protocol version 1.3 or greater, all records after the server key exchange are encrypted. This encryption prevents the detection of the ServerCertificate record, because this record is indistinguishable from encrypted application data. In addition, usage of Transport Layer Security protocol version 1.3 or greater may result in increased difficulty in detecting whether network traffic corresponds to client data. Unlike the scenario for Transport Layer Security protocol version sub-1.3, in version 1.3 or greater client alert messages (e.g., alerts generated through certificate pinning detecting that an expected digital certificate does not match a received digital certificate) can be encrypted and therefore appear to be encrypted application payload data from the application executing at the client rather than indications of the failure to negotiate successfully the encryption protocol and corresponding handshake. Accordingly, in these examples, the detection process may begin when a ServerHello message is seen by server 206, because this message may indicate that the protocol version for the corresponding session will be TLS 1.3. At this point, detection module 106 may optionally set a pin check flag. When server 206 sees data from the client, detection module 106 may optionally set a second flag as well. Finally, if data is transmitted by server 208 in response then the pin check flag may be cleared by detection module 106 as long as the client data flag has been previously toggled. In this example, the connection prior to this point may be assumed by detection module 106 to be certificate pinned. If computing device 202 sends data but the connection then terminates with no response from the server, then detection module 106 may assume that the data from the client was an encrypted alert in response to receiving a digital certificate that does not match the one that was expected.

At step 306, one or more of the systems described herein may perform a security action as part of the security network proxy to protect the client device at least in part based on detecting whether the network connection between the client device and the server device is certificate pinned. For example, performance module 108 may perform a security action as part of server 206 to protect computing device 202 based at least in part on detecting whether the network connection between computing device 202 and server 208 is certificate pinned.

Performance module 108 may perform the security action in a variety of ways. Returning to FIG. 5, performance module 108 may optionally perform, at step 508, a whitelisting action to whitelist a host or domain to which the application at computing device 202 was attempting to connect. Performance module 108 may perform the whitelisting action based on a conclusion that the application is successfully connecting to the network destination to which the application was properly designed to connect, with the greater level of security and assurance provided by the certificate pinning procedure, as discussed above. Because the application is successfully connecting according to certificate pinning, performance module 108 may establish a higher level of trust for the application and furthermore allow the application to proceed with network communications using an encryption protocol that server 206 cannot or does not decrypt. Moreover, in most cases a corresponding programmer or user will retry at least once to establish the network connection, and the whitelisting of the network connection may ensure that these retry efforts are successful, unlike the initial attempt.

At the beginning of step 306, performance module 108 may only possess a numerical Internet Protocol address of the network destination to which computing device 202 is attempting to connect. Nevertheless, on the Internet many sites may be hosted at the same Internet Protocol address, and similarly a single website may use servers at multiple Internet Protocol addresses to increase capacity and availability. Therefore, the Internet Protocol address information itself does not uniquely identify which site or destination the corresponding application is attempting to establish a network connection with. Moreover, these factors therefore decrease the chance of performance module 108 making a correct decision about which security action to perform, if the decision is based on the Internet Protocol address information alone. Accordingly, to address these deficiencies, performance module 108 may also optionally supplement the Internet Protocol address information with information from the DNS cache, as outlined above. In particular, performance module 108 may optionally lookup the Internet Protocol address within the DNS cache and thereby identify one or more host names or domains that the specific user or application engaged with previously. For example, even if a single Internet Protocol address, such as 69.89.31.226, as an arbitrary example, may provide services for multiple different hosts or servers, performance module 108 may optionally check the DNS cache to identify which specific host, domain, or service was previously associated with the specific Internet Protocol address, thereby providing performance module 108 with additional information with which to decide which security action to perform, if any. Similarly, in a scenario where a domain name maps into multiple Internet Protocol addresses, then performance module 108 may whitelist the multiple Internet Protocol addresses as part of a procedure for whitelisting the domain itself.

As one specific example, if the application previously requested an Internet Protocol address for the domain "comcast.com," then the DNS cache may record both this domain and the corresponding Internet Protocol address. Subsequently, if performance module 108 identifies a later network connection attempt that is targeting the same Internet Protocol address as before, then performance module 108 may check the DNS cache and verify that this specific application and/or user previously retrieved that Internet Protocol address when requesting the Internet Protocol address for the domain "comcast.com." Accordingly, performance module 108 may conclude that the current network traffic is more likely to be associated with "comcast.com" than another domain, even if the same Internet Protocol address serves multiple domains, as discussed above.

In another example, performance module 108 may leverage information, metadata, and/or attributes extracted from decrypted network traffic to customize a security policy applied to subsequent encrypted network traffic. The subsequent network traffic may remain encrypted according to the whitelisting procedure at step 508. In other words, even though modules 102 may bypass the attempt to break the network connection for the subsequent network traffic, and therefore modules 102 may be unable to view into the underlying content of that network traffic, performance module 108 may nevertheless use information extracted from an initial decryption of previous network traffic when customizing a security policy for future network traffic. In these examples, performance module 108 may infer that one or more attributes that applied to the earlier network traffic (e.g., a type of network traffic or an identity or type of the application) will also apply to future encrypted network traffic despite the fact that modules 102 omit the decrypting procedure for the future encrypted network traffic and, therefore, cannot view into the network traffic content to verify that the attributes are still applicable.

In addition to the above, in some examples, performance module 108 may perform the security action as part of the security network proxy based at least in part on the security network proxy determining whether the network connection corresponds to a web browser application or a non-web-browser application. It may be beneficial for performance module 108 to perform this distinguishing decision between web browsers and applications in order to maximize an amount of network traffic that is intercepted according to method 300. When network connections are intercepted by server 206, server 206 may optionally send back information on cases where server 206 can determine whether the network connection is from an application or instead a web browser. In these examples, detection module 106 may compare a signature of components of a TLS (or other suitable encryption protocol) handshake message with known signatures of web browsers. These signatures may be preconfigured based on known web browsers. In addition, if detection module 106 determines that the network traffic corresponds to a browser, then detection module 106 may report that result and also upload one or more TLS parameter signatures to supplement a set of known browser signatures for classification of future connections.

In contrast, if detection module 106 detects, at step 304, that the application is not configured according to certificate pinning, then performance module 108 may optionally omit the whitelisting procedure at step 508, as discussed above. These applications may not be configured according to certificate pinning and, therefore, these applications may not provide a higher level of security and assurance to server 206 that is associated with certificate pinning. Accordingly, in these examples server 206 may optionally proceed with performing the interception procedure of FIG. 4 and/or FIG. 6, while applying one or more security policies to decrypted network traffic. Moreover, in these examples, the failure of the applications to perform certificate pinning may enable the interception procedure to proceed without causing the intended functionality of the application to break, such that server 206 may continuously perform the interception procedure and manage a continuous stream of decrypted network traffic.

The various embodiments outlined above provide a solution that improves upon related technology in a variety of ways. One major advantage is the automation that is built into real-time detection and identification of domains that are identified as certificate pinned using both active and passive network analysis. Most related proxy solutions rely on manual whitelists or whitelisting of entire domains. In contrast, various ones of the embodiments outlined above will only whitelist domains that have been detected as involved with client-initiated certificate pinning. Moreover, the solutions outlined above may automatically age-off whitelisted domains to again detect whether the corresponding network connection is still certificate pinned in an effort to ensure that only the ones that are still using certificate pinning technology are whitelisted. Another advantage is that if a user visits a particular domain from a web browser that does not perform certificate pinning, then interception can occur. In contrast, if another user uses an application associated with the same domain, and this application performs certificate pinning (as distinct from the web browser scenario listed above), then the network connection can still be made as the network connection will be whitelisted at step 508 and subsequent network connection attempts will succeed normally. Additionally, the fact that the interception procedure can be user-specific provides greater control and interception breadth instead of whitelisting the same domain for all networks and/or all users.

Figure 7:
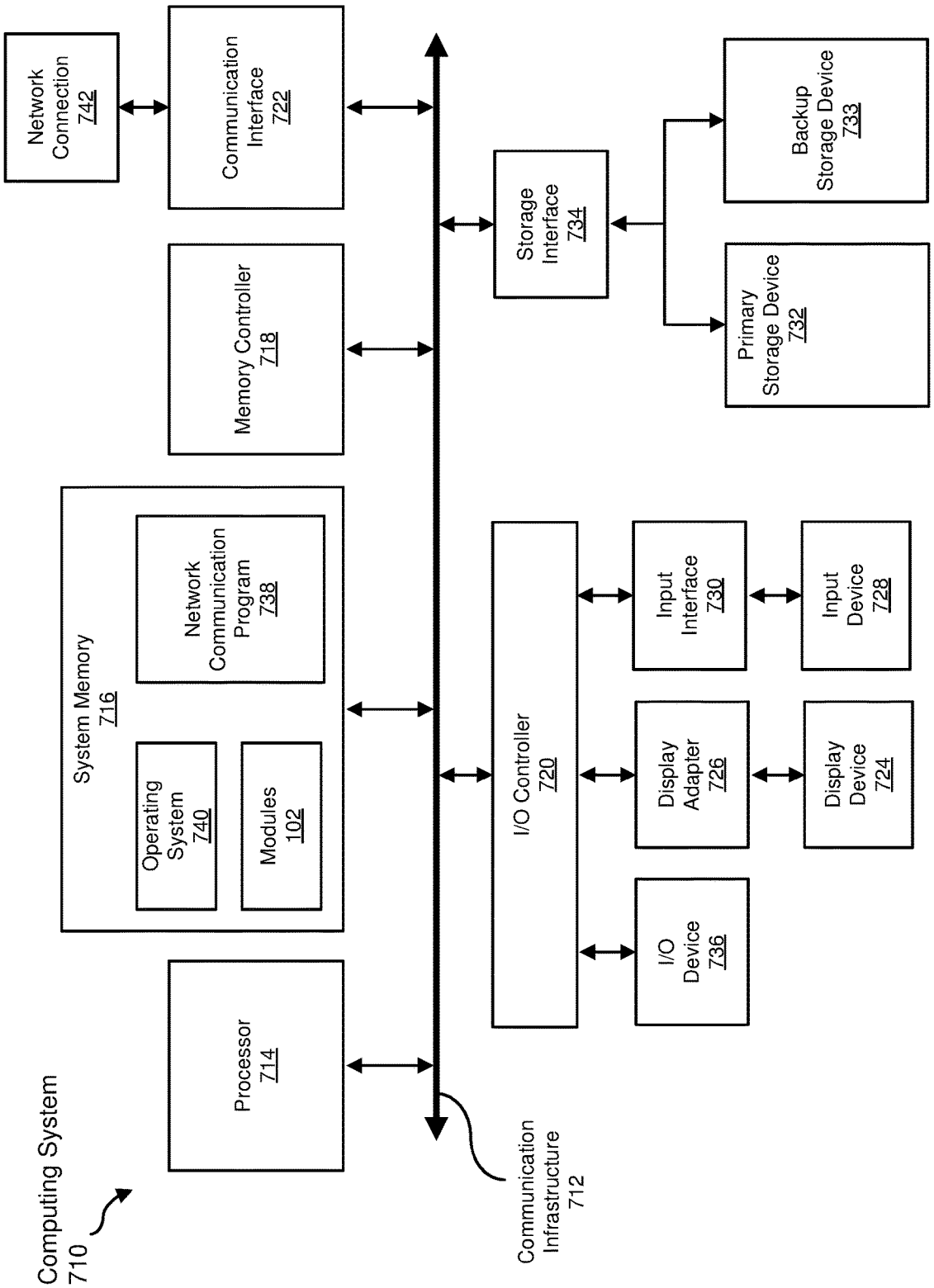
FIG. 7 is a block diagram of an example computing system capable of implementing one or more of the embodiments described and/or illustrated herein.

FIG. 7 is a block diagram of an example computing system 710 capable of implementing one or more of the embodiments described and/or illustrated herein. For example, all or a portion of computing system 710 may perform and/or be a means for performing, either alone or in combination with other elements, one or more of the steps described herein (such as one or more of the steps illustrated in FIG. 3). All or a portion of computing system 710 may also perform and/or be a means for performing any other steps, methods, or processes described and/or illustrated herein.

Computing system 710 broadly represents any single or multi-processor computing device or system capable of executing computer-readable instructions. Examples of computing system 710 include, without limitation, workstations, laptops, client-side terminals, servers, distributed computing systems, handheld devices, or any other computing system or device. In its most basic configuration, computing system 710 may include at least one processor 714 and a system memory 716.

Processor 714 generally represents any type or form of physical processing unit (e.g., a hardware-implemented central processing unit) capable of processing data or interpreting and executing instructions. In certain embodiments, processor 714 may receive instructions from a software application or module. These instructions may cause processor 714 to perform the functions of one or more of the example embodiments described and/or illustrated herein.

System memory 716 generally represents any type or form of volatile or non-volatile storage device or medium capable of storing data and/or other computer-readable instructions. Examples of system memory 716 include, without limitation, Random Access Memory (RAM), Read Only Memory (ROM), flash memory, or any other suitable memory device. Although not required, in certain embodiments computing system 710 may include both a volatile memory unit (such as, for example, system memory 716) and a non-volatile storage device (such as, for example, primary storage device 732, as described in detail below). In one example, one or more of modules 102 from FIG. 1 may be loaded into system memory 716.

In some examples, system memory 716 may store and/or load an operating system 740 for execution by processor 714. In one example, operating system 740 may include and/or represent software that manages computer hardware and software resources and/or provides common services to computer programs and/or applications on computing system 710. Examples of operating system 740 include, without limitation, LINUX, JUNOS, MICROSOFT WINDOWS, WINDOWS MOBILE, MAC OS, APPLE'S 10S, UNIX, GOOGLE CHROME OS, GOOGLE'S ANDROID, SOLARIS, variations of one or more of the same, and/or any other suitable operating system.

In certain embodiments, example computing system 710 may also include one or more components or elements in addition to processor 714 and system memory 716. For example, as illustrated in FIG. 7, computing system 710 may include a memory controller 718, an Input/Output (I/O) controller 720, and a communication interface 722, each of which may be interconnected via a communication infrastructure 712. Communication infrastructure 712 generally represents any type or form of infrastructure capable of facilitating communication between one or more components of a computing device. Examples of communication infrastructure 712 include, without limitation, a communication bus (such as an Industry Standard Architecture (ISA), Peripheral Component Interconnect (PCI), PCI Express (PCIe), or similar bus) and a network.

Memory controller 718 generally represents any type or form of device capable of handling memory or data or controlling communication between one or more components of computing system 710. For example, in certain embodiments memory controller 718 may control communication between processor 714, system memory 716, and I/O controller 720 via communication infrastructure 712.

I/O controller 720 generally represents any type or form of module capable of coordinating and/or controlling the input and output functions of a computing device. For example, in certain embodiments I/O controller 720 may control or facilitate transfer of data between one or more elements of computing system 710, such as processor 714, system memory 716, communication interface 722, display adapter 726, input interface 730, and storage interface 734.

As illustrated in FIG. 7, computing system 710 may also include at least one display device 724 coupled to I/O controller 720 via a display adapter 726. Display device 724 generally represents any type or form of device capable of visually displaying information forwarded by display adapter 726. Similarly, display adapter 726 generally represents any type or form of device configured to forward graphics, text, and other data from communication infrastructure 712 (or from a frame buffer, as known in the art) for display on display device 724.

As illustrated in FIG. 7, example computing system 710 may also include at least one input device 728 coupled to I/O controller 720 via an input interface 730. Input device 728 generally represents any type or form of input device capable of providing input, either computer or human generated, to example computing system 710. Examples of input device 728 include, without limitation, a keyboard, a pointing device, a speech recognition device, variations or combinations of one or more of the same, and/or any other input device.

Additionally or alternatively, example computing system 710 may include additional I/O devices. For example, example computing system 710 may include I/O device 736. In this example, I/O device 736 may include and/or represent a user interface that facilitates human interaction with computing system 710. Examples of I/O device 736 include, without limitation, a computer mouse, a keyboard, a monitor, a printer, a modem, a camera, a scanner, a microphone, a touchscreen device, variations or combinations of one or more of the same, and/or any other I/O device.

Communication interface 722 broadly represents any type or form of communication device or adapter capable of facilitating communication between example computing system 710 and one or more additional devices. For example, in certain embodiments communication interface 722 may facilitate communication between computing system 710 and a private or public network including additional computing systems. Examples of communication interface 722 include, without limitation, a wired network interface (such as a network interface card), a wireless network interface (such as a wireless network interface card), a modem, and any other suitable interface. In at least one embodiment, communication interface 722 may provide a direct connection to a remote server via a direct link to a network, such as the Internet. Communication interface 722 may also indirectly provide such a connection through, for example, a local area network (such as an Ethernet network), a personal area network, a telephone or cable network, a cellular telephone connection, a satellite data connection, or any other suitable connection.

In certain embodiments, communication interface 722 may also represent a host adapter configured to facilitate communication between computing system 710 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 722 may also allow computing system 710 to engage in distributed or remote computing. For example, communication interface 722 may receive instructions from a remote device or send instructions to a remote device for execution.

In some examples, system memory 716 may store and/or load a network communication program 738 for execution by processor 714. In one example, network communication program 738 may include and/or represent software that enables computing system 710 to establish a network connection 742 with another computing system (not illustrated in FIG. 7) and/or communicate with the other computing system by way of communication interface 722. In this example, network communication program 738 may direct the flow of outgoing traffic that is sent to the other computing system via network connection 742. Additionally or alternatively, network communication program 738 may direct the processing of incoming traffic that is received from the other computing system via network connection 742 in connection with processor 714.

Although not illustrated in this way in FIG. 7, network communication program 738 may alternatively be stored and/or loaded in communication interface 722. For example, network communication program 738 may include and/or represent at least a portion of software and/or firmware that is executed by a processor and/or Application Specific Integrated Circuit (ASIC) incorporated in communication interface 722.

As illustrated in FIG. 7, example computing system 710 may also include a primary storage device 732 and a backup storage device 733 coupled to communication infrastructure 712 via a storage interface 734. Storage devices 732 and 733 generally represent any type or form of storage device or medium capable of storing data and/or other computer-readable instructions. For example, storage devices 732 and 733 may be a magnetic disk drive (e.g., a so-called hard drive), a solid state drive, a floppy disk drive, a magnetic tape drive, an optical disk drive, a flash drive, or the like. Storage interface 734 generally represents any type or form of interface or device for transferring data between storage devices 732 and 733 and other components of computing system 710.

In certain embodiments, storage devices 732 and 733 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 732 and 733 may also include other similar structures or devices for allowing computer software, data, or other computer-readable instructions to be loaded into computing system 710. For example, storage devices 732 and 733 may be configured to read and write software, data, or other computer-readable information. Storage devices 732 and 733 may also be a part of computing system 710 or may be a separate device accessed through other interface systems.

Many other devices or subsystems may be connected to computing system 710. Conversely, all of the components and devices illustrated in FIG. 7 need not be present to practice the embodiments described and/or illustrated herein. The devices and subsystems referenced above may also be interconnected in different ways from that shown in FIG. 7. Computing system 710 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 710. All or a portion of the computer program stored on the computer-readable medium may then be stored in system memory 716 and/or various portions of storage devices 732 and 733. When executed by processor 714, a computer program loaded into computing system 710 may cause processor 714 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 710 may be configured as an Application Specific Integrated Circuit (ASIC) adapted to implement one or more of the example embodiments disclosed herein.

Figure 8:
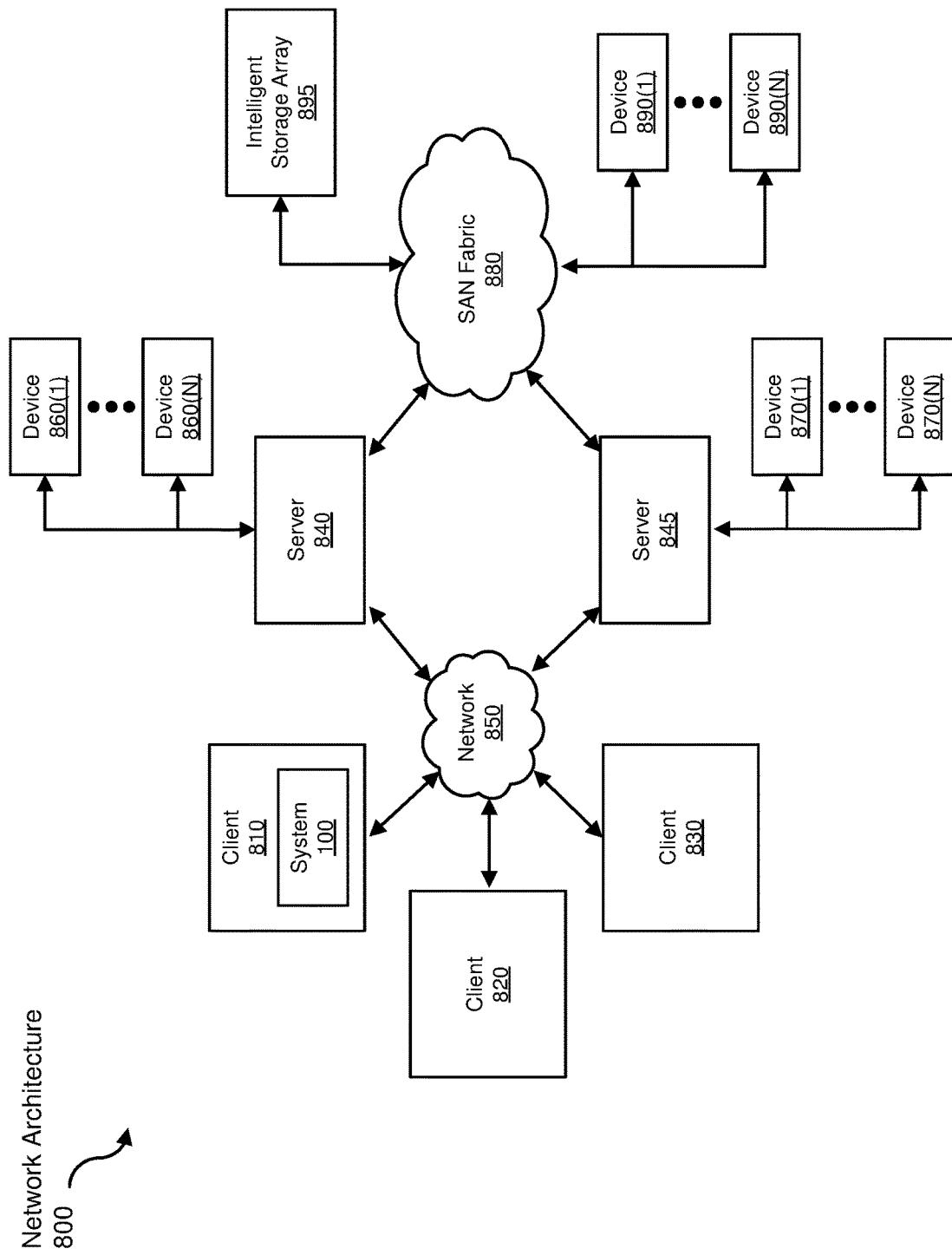
FIG. 8 is a block diagram of an example computing network capable of implementing one or more of the embodiments described and/or illustrated herein.

FIG. 8 is a block diagram of an example network architecture 800 in which client systems 810, 820, and 830 and servers 840 and 845 may be coupled to a network 850. As detailed above, all or a portion of network architecture 800 may perform and/or be a means for performing, either alone or in combination with other elements, one or more of the steps disclosed herein (such as one or more of the steps illustrated in FIG. 3). All or a portion of network architecture 800 may also be used to perform and/or be a means for performing other steps and features set forth in the present disclosure.

Client systems 810, 820, and 830 generally represent any type or form of computing device or system, such as example computing system 710 in FIG. 7. Similarly, servers 840 and 845 generally represent computing devices or systems, such as application servers or database servers, configured to provide various database services and/or run certain software applications. Network 850 generally represents any telecommunication or computer network including, for example, an intranet, a WAN, a LAN, a PAN, or the Internet. In one example, client systems 810, 820, and/or 830 and/or servers 840 and/or 845 may include all or a portion of system 100 from FIG. 1.

As illustrated in FIG. 8, one or more storage devices 860(1)-(N) may be directly attached to server 840. Similarly, one or more storage devices 870(1)-(N) may be directly attached to server 845. Storage devices 860(1)-(N) and storage devices 870(1)-(N) generally represent any type or form of storage device or medium capable of storing data and/or other computer-readable instructions. In certain embodiments, storage devices 860(1)-(N) and storage devices 870(1)-(N) may represent Network-Attached Storage (NAS) devices configured to communicate with servers 840 and 845 using various protocols, such as Network File System (NFS), Server Message Block (SMB), or Common Internet File System (CIFS).

Servers 840 and 845 may also be connected to a Storage Area Network (SAN) fabric 880. SAN fabric 880 generally represents any type or form of computer network or architecture capable of facilitating communication between a plurality of storage devices. SAN fabric 880 may facilitate communication between servers 840 and 845 and a plurality of storage devices 890(1)-(N) and/or an intelligent storage array 895. SAN fabric 880 may also facilitate, via network 850 and servers 840 and 845, communication between client systems 810, 820, and 830 and storage devices 890(1)-(N) and/or intelligent storage array 895 in such a manner that devices 890(1)-(N) and array 895 appear as locally attached devices to client systems 810, 820, and 830. As with storage devices 860(1)-(N) and storage devices 870(1)-(N), storage devices 890(1)-(N) and intelligent storage array 895 generally represent any type or form of storage device or medium capable of storing data and/or other computer-readable instructions.

In certain embodiments, and with reference to example computing system 710 of FIG. 7, a communication interface, such as communication interface 722 in FIG. 7, may be used to provide connectivity between each client system 810, 820, and 830 and network 850. Client systems 810, 820, and 830 may be able to access information on server 840 or 845 using, for example, a web browser or other client software. Such software may allow client systems 810, 820, and 830 to access data hosted by server 840, server 845, storage devices 860(1)-(N), storage devices 870(1)-(N), storage devices 890(1)-(N), or intelligent storage array 895. Although FIG. 8 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 840, server 845, storage devices 860(1)-(N), storage devices 870(1)-(N), storage devices 890(1)-(N), intelligent storage array 895, or any combination thereof. All or a portion of one or more of the example embodiments disclosed herein may also be encoded as a computer program, stored in server 840, run by server 845, and distributed to client systems 810, 820, and 830 over network 850.

As detailed above, computing system 710 and/or one or more components of network architecture 800 may perform and/or be a means for performing, either alone or in combination with other elements, one or more steps of an example method for detecting certificate pinning.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for detecting certificate pinning, at least a portion of the method being performed by a computing device comprising at least one processor, the method comprising:

attempting, by a security network proxy, to break a network connection between a client device and a server device;

detecting, by the security network proxy, whether the network connection between the client device and the server device is certificate pinned based on a result of attempting to break the network connection; and performing a security action by the security network proxy to protect the client device at least in part based on detecting whether the network connection between the client device and the server device is certificate pinned;

wherein:

the method further comprises the security network proxy maintaining a domain name system cache by tracking domain name system requests issued by the client device; and detecting whether a subsequent network connection is pinned comprises the security network proxy looking up an Internet Protocol address for the server device within the domain name system cache to discover a host name with which the security network proxy detected a corresponding application previously engaging.

2. The computer-implemented method of claim 1, wherein attempting to break the network connection between the client device and the server device comprises intercepting a digital certificate that the server device directed to the client device to establish encrypted communications.

3. The computer-implemented method of claim 2, wherein attempting to break the network connection between the client device and the server device comprises the security network proxy forwarding a different digital certificate to the client device as a substitute rather than forwarding the digital certificate that the server device directed to the client device.

4. The computer-implemented method of claim 3, wherein the attempt to break the network connection between the client device and the server device succeeds in response to an application at the client device verifying that the different digital certificate does not match an identifier for a digital certificate expected by the application according to certificate pinning.

5. The computer-implemented method of claim 2, wherein the digital certificate that the server device directed to the client device to establish encrypted communications is provided by the server device according to the Transport Layer Security protocol.

6. The computer-implemented method of claim 5, wherein the Transport Layer Security protocol comprises
Transport Layer Security protocol version 1.3 or greater.

7. The computer-implemented method of claim 1, wherein the security action performed by the security network proxy comprises whitelisting a domain corresponding to the server device based on detecting that the network connection between the client device and the server device is certificate pinned.

8. The computer-implemented method of claim 1, wherein the security network proxy maintains the domain name system cache that maps domains to Internet Protocol addresses.

9. The computer-implemented method of claim 1, wherein detecting whether the network connection between the client device and the server device is certificate pinned is based on an analysis of at least one of:
a Transport Layer Security protocol handshake message;
a transmission control protocol FIN packet; or
a transmission control protocol RST packet.

10. The computer-implemented method of claim 1, wherein performing the security action by the security network proxy comprises:
decrypting network traffic;
extracting at least one attribute of the decrypted network traffic; and
applying a security policy to subsequent encrypted network traffic based on the extracted attribute.

11. A system for detecting certificate pinning, the system comprising:
an attempting module, stored in memory, that attempts, as a part of a security network proxy, to break a network connection between a client device and a server device;
a detection module, stored in memory, that detects, as a part of the security network proxy, whether the network connection between the client device and the server device is certificate pinned based on a result of attempting to break the network connection;
a performance module, stored in memory, that performs a security action as a part of the security network proxy to protect the client device at least in part based on detecting whether the network connection between the client device and the server device is certificate pinned; and
at least one physical processor configured to execute the attempting module, the detection module, and the performance module;

wherein:
the security network proxy maintains a domain name system cache by tracking domain name system requests issued by the client device; and
the detection module is configured to detect whether a subsequent network connection is pinned at least in part through the security network proxy looking up an Internet Protocol address for the server device within the domain name system cache to discover a host name with which the security network proxy detected a corresponding application previously engaging.

12. The system of claim 11, wherein the attempting module attempts to break the network connection between the client device and the server device by intercepting a digital certificate that the server device directed to the client device to establish encrypted communications.

13. The system of claim 12, wherein the attempting module attempts to break the network connection between the client device and the server device at least in part by the security network proxy forwarding a different digital certificate to the client device as a substitute rather than forwarding the digital certificate that the server device directed to the client device.

14. The system of claim 13, wherein the attempt to break the network connection between the client device and the server device succeeds in response to an application at the client device verifying that the different digital certificate does not match an identifier for a digital certificate expected by the application according to certificate pinning.

15. The system of claim 12, wherein the digital certificate that the server device directed to the client device to establish encrypted communications is provided by the server device according to the Transport Layer Security protocol.

16. The system of claim 15, wherein the Transport Layer Security protocol comprises
Transport Layer Security protocol version 1.3 or greater.

17. The system of claim 11, wherein the security action performed by the security network proxy comprises whitelisting a domain corresponding to the server device based on detecting that the network connection between the client device and the server device is certificate pinned.

18. The system of claim 11, wherein the security network proxy maintains the domain name system cache that maps domains to Internet Protocol addresses.

19. The system of claim 11, wherein the detection module detects whether the network connection between the client device and the server device is certificate pinned based on an analysis of at least one of:
a Transport Layer Security protocol handshake message;
a transmission control protocol FIN packet; or
a transmission control protocol RST packet.

20. A non-transitory computer-readable medium comprising one or more computer-readable instructions that, when executed by at least one processor of a computing device, cause the computing device to:
attempt, by a security network proxy, to break a network connection between a client device and a server device;
detect, by the security network proxy, whether the network connection between the client device and the server device is certificate pinned based on a result of attempting to break the network connection; and
perform a security action by the security network proxy to protect the client device at least in part based on detecting whether the network connection between the client device and the server device is certificate pinned;

wherein:

the security network proxy maintains a domain name system cache by tracking domain name system requests issued by the client device; and detecting whether a subsequent network connection is pinned comprises the security network proxy looking up an Internet Protocol address for the server device within the domain name system cache to discover a host name with which the security network proxy detected a corresponding application previously engaging.

\* \* \* \* \*